United States Patent
Ward

(10) Patent No.: US 6,726,255 B1
(45) Date of Patent: Apr. 27, 2004

(54) TUBE-IN-TUBE JOINT

(76) Inventor: James C. Ward, 119 Creek View Dr., Monticello, KY (US) 42633

( * ) Notice: Subject to any disclaimer, the term of this patent is extended or adjusted under 35 U.S.C. 154(b) by 86 days.

(21) Appl. No.: 10/105,715

(22) Filed: Mar. 25, 2002

(51) Int. Cl.[7] .............................. F16L 27/00; F16D 1/00
(52) U.S. Cl. ..................... 285/373; 403/301; 403/310
(58) Field of Search ................ 285/404, 66, 123.13, 285/300, 370, 373, 397, 302, 303; 403/300–303, 305, 310; 256/65.16, 59, 65.01, 19; 482/130, 129, 94

(56) References Cited

U.S. PATENT DOCUMENTS

| | | |
|---|---|---|
| 2,273,102 A | 2/1942 | Harris et al. |
| 2,423,892 A | 7/1947 | King |
| 2,912,013 A | 4/1959 | Freyholdt |
| 2,894,302 A | 7/1959 | Fox |
| 2,997,317 A * | 8/1961 | Scott ........................... 285/397 |
| 3,484,830 A * | 12/1969 | Wagner et al. ............... 285/397 |
| 3,606,408 A * | 9/1971 | Wagner ....................... 403/297 |
| 4,053,248 A * | 10/1977 | Schultenkamper et al. . 403/337 |
| 4,101,226 A | 7/1978 | Parisien |
| 4,102,529 A * | 7/1978 | Neblung et al. ............. 403/300 |
| 4,104,000 A | 8/1978 | Fleischmann |
| 4,140,416 A | 2/1979 | Parisien |
| 4,461,509 A | 7/1984 | Yaotani et al. |
| 4,718,789 A * | 1/1988 | Kuenen ....................... 403/300 |
| 5,061,000 A * | 10/1991 | Haugen et al. ............. 285/397 |
| 5,127,762 A * | 7/1992 | Havlovitz .................... 403/300 |
| 5,224,741 A * | 7/1993 | Burkit et al. ................ 285/114 |
| 5,536,107 A | 7/1996 | Baker |
| 5,720,567 A * | 2/1998 | Rinderer ...................... 403/300 |
| 5,896,980 A | 4/1999 | Butler |
| 6,324,988 B1 * | 12/2001 | Svensson .................... 403/300 |

FOREIGN PATENT DOCUMENTS

| | | | |
|---|---|---|---|
| DE | DL 58083 A * | 10/1967 | .................. 285/397 |
| DE | 2363593 A * | 7/1975 | .................. 285/397 |

* cited by examiner

Primary Examiner—Lynne H. Browne
Assistant Examiner—Aaron Dunwoody
(74) Attorney, Agent, or Firm—Charles G. Lamb; Middleton Reutlinger

(57) ABSTRACT

A tube-in-tube joint includes a rectangular coupling having a longitudinally extending slot the entire length of the coupling which is inserted into opposed ends of two rectangular elongated tube members. Each elongated tube member is provided with an opening therein to receive a bolt therethrough, preferably a carriage bolt, wherein a squared shoulder portion adjacent the head of the carriage bolt fits within the slot of the coupling and the bolt opening. Alternatively, socket head cap screws extend through the bolt openings in the elongated tubes and the coupling slot receives T-nuts which are held in place in the longitudinally extending slot.

8 Claims, 2 Drawing Sheets

TUBE-IN-TUBE JOINT

BACKGROUND OF THE INVENTION

The present invention relates to a splice joint for elongated tubes and more particularly relates to a joint connection for two elongated tubes using a smaller tube inside the two elongated tubes as the means for splicing the two elongated tubes together.

In the assembling of structures which are comprised of a plurality of elongated tubes, it is common practice to use different types of splices to join the tubes together in an assembly. For example, the tubes may contain female or male threadings on each end and couplings having male or female threads are mated with adjacent ends of two elongated tubes. In the case of tubes of rectangular configuration, it is not feasible to use threaded connections and therefore other devices must be used to make these spliced connections.

SUMMARY OF THE INVENTION

It is an object of the present invention to provide a tube-in-tube joint for joining tubes of a rectangular configuration.

It is also an object of the present invention to provide a tube-in-tube joint connection which requires no special tools for assembling.

It is a further object of the present invention to provide a tube-in-tube joint that makes a rigid alignment between the two tubes to be joined.

It is even another further object of the present invention to provide a tube-in-tube joint for rectangular shaped tubes which are easy to install and easy to take apart.

More particularly, the present invention provides for a coupling member for use in a tube-in-tube joint wherein the coupling member is of rectangular configuration with a slot extending the entire length of the coupling member. The coupling member is sized to fit within opposed ends of two elongated rectangular tubes.

Even more particularly, the present invention provides for a tube-in-tube joint which includes a first elongated tube having a first bolt opening at a preselected location adjacent one end of the first tube, a second elongated tube having a second bolt opening at a preselected location adjacent one end of said second tube which is opposed to the one end of said first elongated tube and a coupling member which is relatively short fits within the opposed ends of the first and second tubes and is provided with a slot which extends the length of the coupling member. A first bolt extends through the slot of the coupling member in the first bolt opening and a second bolt extends through the slot of the coupling member and said second bolt opening with mating nuts on each of the bolts holding the bolts in place and completing the connection of the tube-in-tube joint.

Additional objects, features and advantages of the present invention will become apparent to those skilled in the art upon consideration of the following detailed description of the preferred embodiment exemplifying the best modes of carrying out the invention as presently perceived. The detailed description particularly refers to the accompanying figures in which:

DETAILED DESCRIPTION OF THE PREFERRED EMBODIMENTS

Figure 1:
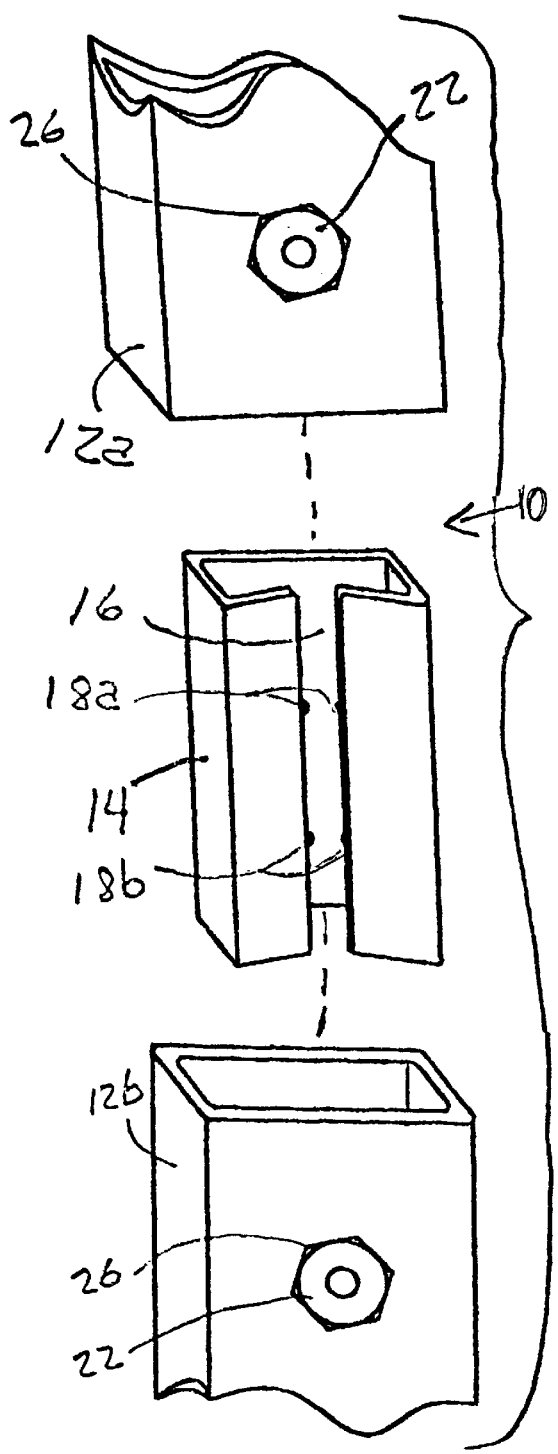
FIG. 1 is an exploded view of a preferred embodiment of the present invention.
Figure 2:
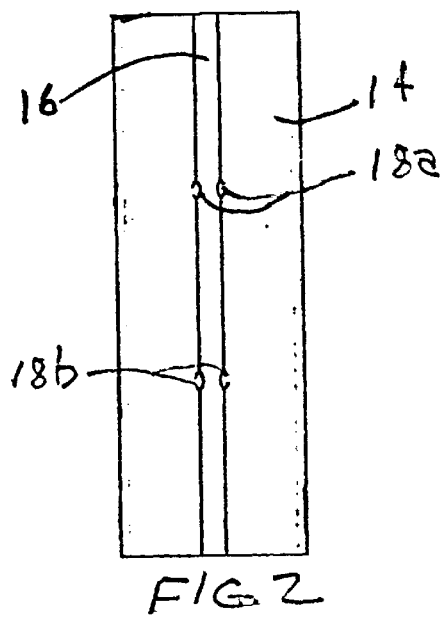
FIG. 2 is a top view of a coupling of FIG. 1.
Figure 3:
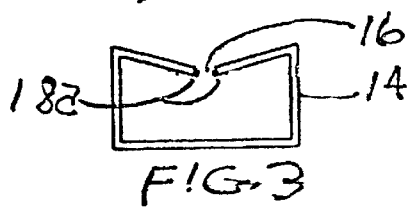
FIG. 3 is an end view of the coupling member of FIG. 2.

As shown in FIGS. 1–6, a joint 10 is comprised of a first elongated tube 12a and a second elongated tube 12b which are attached to each other by a tubular coupling member 14. Elongated tubes 12a and 12b are of rectangular configuration as well as the coupling member 14. However, the coupling member 14 has an outer periphery slightly less than the inner periphery of the elongated tubes 12a and 12b so that the rectangular coupling member 14 is easily received within the open ends of the elongated tubes 12a and 12b.

Figure 5:
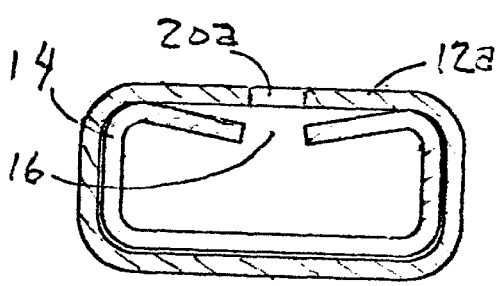
FIG. 5 is a cross-sectional view taken along line 5—5 of FIG. 4 excluding the bolting attachment of the tube-in-tube joint.
Figure 6:
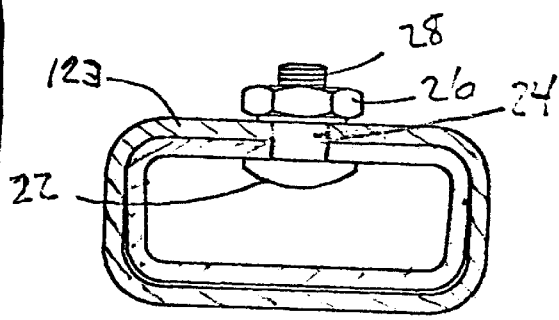
FIG. 6 is the cross-sectional view of FIG. 5 showing a bolt in an attaching condition.
Figure 4:
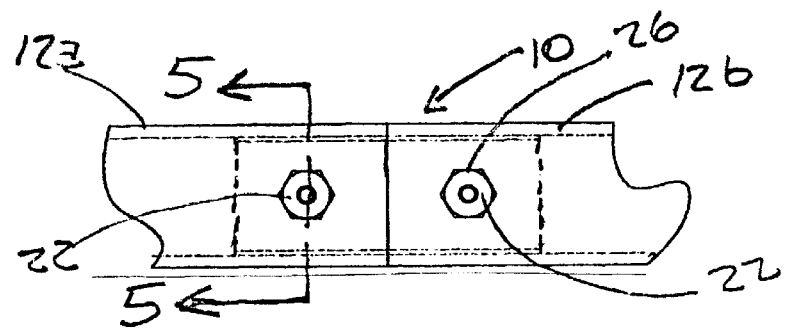
FIG. 4 is a top view of a tube-in-tube joint of the present invention.

The coupling 14 is provided with a slot 16 which extends the entire length of the coupling 14. Generally, coupling 14 tapers downwardly along its entire length toward the slot 16. In the slot 16 at preselected locations along opposed edges are inwardly extending fingers or stops identified as a pair of stops 18a adjacent one end and a pair of stops identified as 18b adjacent the opposite end. Stops 18a, 18b engage a square shoulder 24 of a carriage bolt 22, as shown in FIG. 6 to position the bolt 22 in alignment with bolt openings in the elongated tubes 12a, 12b. Each of the elongated tubes 12a and 12b are provided with an opening therein to receive a bolt, such as, a carriage bolt 22 therethrough. In the use of the term "bolt" herein, "bolt" includes a rod or pin that has a head at one end and a screw thread at the other. As shown in FIG. 5, the elongated tube 12a includes a bolt receiving opening 20a therein to receive the carriage bolt 22. As shown in FIG. 6, the carriage bolt 22 includes a squared shoulder 24 and a threaded end 28 which extends through the opening 20a. The threaded end 28 receives a nut 26 thereon which couples the tubular coupling member 14 to the elongated tube 12a.

In the coupling of a tube-in-tube joint, the carriage bolt 22 is inserted into the opening 20a (FIG. 5) and the coupling member 14 is inserted into the end of the tubular member, including the hole 20a, until the stop means or fingers 18a engage with the shoulder 24 of the carriage bolt 22. The carriage bolt 22, which may be held in place with a loosely fitting nut 26 thereon, is then tightened wherein the tightening of the nut 26 onto the threaded shaft portion 28 tightens the connection by pulling the coupling member 14 in the area of the slot 16 upwards, as shown in FIG. 6, thereby completing the connection. The operation is duplicated for attaching the elongated tube 12b to the coupling member 16. Generally, the spacing between the stops 18a and 18b is equal to the distance from the center of the carriage bolt receiving openings in the elongated tubes 12a, 12b so that the elongated tubes 12a and 12b are in an abutting relation when the connection has been completed.

Figure 7:
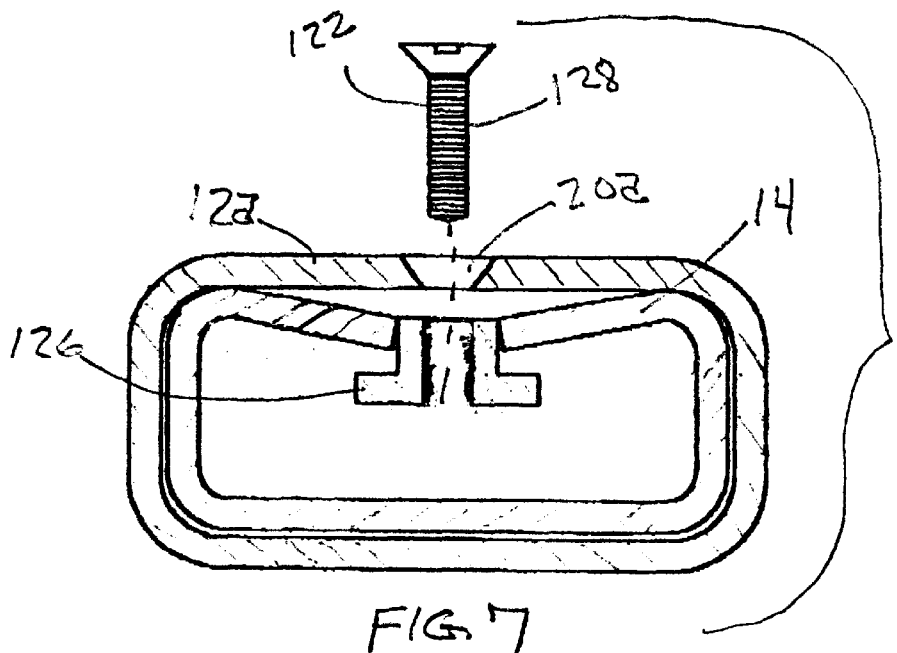
FIG. 7 is an enlarged cross-sectional view of another attaching embodiment of the present invention excluding a bolting attachment of a tube-in-tube joint; and, FIG. 8 is the cross-sectional view of FIG. 7 showing a bolt in an attaching condition.
Figure 8:
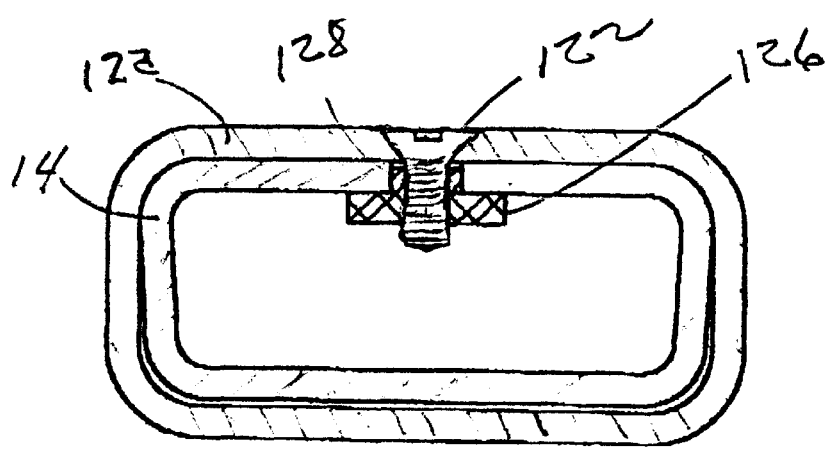

In FIGS. 7 and 8 is shown a second preferred embodiment of the present invention. In FIGS. 7 and 8, instead of using a carriage bolt for connecting the coupling 14 to the elongated tubes 12a, 12b, a socket head cap screw 122 is used in combination with a T-nut 126. In the assembling of the tube-in-tube joint of FIGS. 7 and 8, the T-nut 126 is wedged into the slot 16 at the stop means 18a and the coupling 14 is aligned with the opening 20a and the socket head cap screw is then inserted through the opening 20a. Threaded shaft member 128 is then mated with the internal threads of the T-nut 126.

Although the invention has been described in detail with reference to the preferred embodiments and specific examples, various variations and modifications exist within the scope and spirit of the invention as described and defined in the following claims.

What is claimed is:

1. A tube-in-tube joint comprising:
    a first elongated tube having a first bolt opening at a first preselected location adjacent a first end of said first tube;
    a second elongated tube having a second bolt opening at a preselected location adjacent a second end of said second tube;
    a coupling member having a slot extending an entire length of said coupling member, said coupling member being sized to fit in said first end of said first tube and said second end of said second tube;
    a first bolt extending through said slot in said first bolt opening and a second bolt extending through said slot in said second bolt opening; and,
    a first nut on said first bolt and a second nut on said second bolt.

2. The joint of claim 1, said first elongated tube, said second elongated tube and said coupling member being of rectangular configuration.

3. The joint of claim 1, said first and said second bolts being carriage bolts having square shoulders received within said slot and said openings of said tubes.

4. The joint of claim 1, said first and said second bolts being socket head cap screws with aligned T-nuts in said slot.

5. The joint of claim 1, an area adjacent said slot in said coupling member being tapered downwards toward said slot.

6. A method of joining two elongated tubes together comprising the steps of:
    providing a first elongated tube having a first opening at a preselected location adjacent a first end of said first tube, a second elongated tube having a second bolt opening at a preselected location adjacent a second end of said second tube, and a coupling member having a slot extending an entire length of said coupling member, said coupling member being sized to fit within said first end of said first tube and said second end of said second tube;
    inserting a carriage bolt into said first bolt opening and loosely attaching a nut to said carriage bolt;
    sliding said coupling member into said one end of said first tube wherein said carriage bolt is received within said slot of said coupling member; and,
    tightening said nut onto said carriage bolt.

7. The method of claim 6, said first elongated tube, said second elongated tube and said coupling member being rectangular in shape.

8. The method of claim 6, said coupling member having an area adjacent said slot tapered downwards toward said slot.

\* \* \* \* \*